United States Patent
Sapozhnikov et al.

(10) Patent No.: US 8,737,023 B2
(45) Date of Patent: May 27, 2014

(54) MAGNETIC READER WITH TUNED ANISOTROPY

(71) Applicant: Seagate Technology LLC, Cupertino, CA (US)

(72) Inventors: Victor Boris Sapozhnikov, Minnetonka, MN (US); Mohammed Shariat Ullah Patwari, Eden Prairie, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 13/651,882

(22) Filed: Oct. 15, 2012

(65) Prior Publication Data

US 2014/0106183 A1    Apr. 17, 2014

(51) Int. Cl.
*G11B 5/33* (2006.01)
(52) U.S. Cl.
USPC ........................................... 360/324.1
(58) Field of Classification Search
USPC ............................................. 360/324.11
See application file for complete search history.

(56) References Cited

U.S. PATENT DOCUMENTS

| | | | |
|---|---|---|---|
| 6,705,102 B2 | 3/2004 | Adaniya et al. | |
| 6,856,493 B2 | 2/2005 | Pinarbasi | |
| 7,564,659 B2 | 7/2009 | Freitag et al. | |
| 7,663,848 B1 * | 2/2010 | Huai et al. | 360/324.2 |
| 7,900,342 B2 | 3/2011 | Freitag et al. | |
| 7,936,539 B2 * | 5/2011 | Horng et al. | 360/324.1 |
| 7,999,336 B2 * | 8/2011 | Wang et al. | 257/421 |
| 8,188,558 B2 * | 5/2012 | Wang et al. | 257/421 |
| 8,238,063 B2 * | 8/2012 | Qiu et al. | 360/324.11 |
| 8,395,867 B2 * | 3/2013 | Dimitrov et al. | 360/319 |
| 8,422,176 B1 * | 4/2013 | Leng et al. | 360/313 |
| 8,445,979 B2 * | 5/2013 | Oh et al. | 257/421 |
| 8,507,113 B2 * | 8/2013 | Abarra et al. | 428/811 |
| 8,514,525 B2 * | 8/2013 | Childress et al. | 360/319 |
| 8,525,602 B2 * | 9/2013 | Katti | 331/94.1 |
| 2005/0190509 A1 | 9/2005 | Fox et al. | |

* cited by examiner

*Primary Examiner* — Mark Blouin
(74) *Attorney, Agent, or Firm* — Hall Estill Attorneys at Law

(57) ABSTRACT

Various embodiments may be generally directed to a stack capable of reading magnetic data bits. Such a stack can have a non-magnetic spacer layer disposed between a magnetically free layer and a synthetic antiferromagnet (SAF) where the SAF is configured with an anisotropy tuned to a non-normal direction with respect to an air bearing surface (ABS).

20 Claims, 4 Drawing Sheets

MAGNETIC READER WITH TUNED ANISOTROPY

SUMMARY

Various embodiments of the present disclosure are generally directed to a stack that is capable of magnetic data bit sensing.

In accordance with some embodiments, a magnetic reader can have a non-magnetic spacer layer disposed between a magnetically free layer and a synthetic antiferromagnet (SAF) where the SAF is configured with an anisotropy tuned to a non-normal direction with respect to an air bearing surface (ABS).

DETAILED DESCRIPTION

Continuing emphasis for larger capacity, faster data storage devices has stressed the form factor in which data storage elements can be reliably manufactured and operated. One such data storage element is a magnetic data reader, which responds to data bits programmed on a data storage media to create a data signal. An increase in data bit density for storage media can elevate data capacity, but with the added consequence of inducing unwanted data signal amplitude loss and instability. Hence, industry is striving to provide magnetic data readers capable of providing increased data signal amplitude and stability in small form factor, increased data bit density data storage devices.

Accordingly, a magnetic reader may have a non-magnetic spacer layer disposed between a magnetically free layer and a synthetic antiferromagnet, where the synthetic antiferromagnet is configured with an anisotropy tuned to a non-normal direction with respect to an air bearing surface. The ability to tune the anisotropy of portions of the magnetic reader can maintain magnetic stability and interaction between the synthetic antiferromagnet and the magnetically free layer, which can produce greater data signal amplitude while decreasing magnetic asymmetry.

Figure 1:
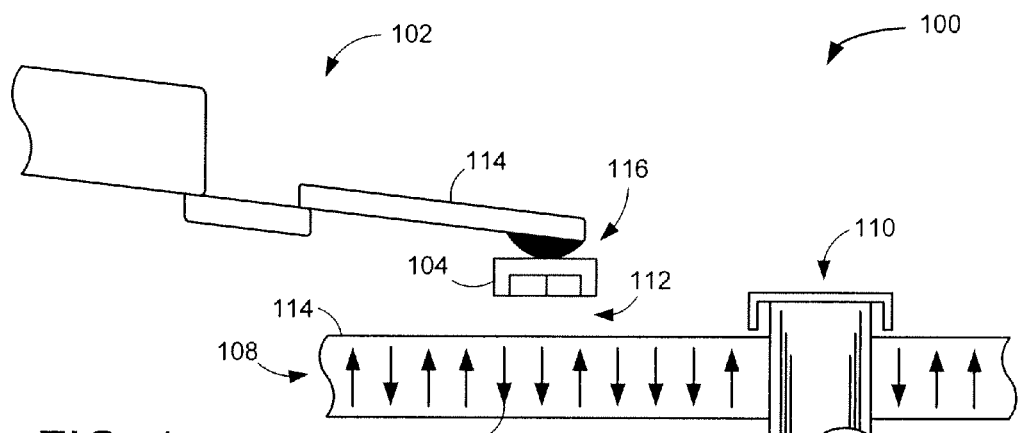
FIG. 1 is a block representation of a portion of an example data storage device in accordance with some embodiments.

While a magnetic reader with tuned anisotropy can be practiced in a variety of non-limiting environments, FIG. 1 generally displays a data transducing portion 100 of a rotating data storage environment. The transducing portion 100 is configured with an actuating assembly 102 that positions a transducing head 104 over programmed data bits 106 present on a magnetic storage media 108 that is attached to, and rotates about, a spindle motor 110 to produce an air bearing surface (ABS) 112. The speed in which the spindle motor 110 rotates allows a slider portion 114 of the actuating assembly 102 to fly on the ABS to position a head gimbal assembly (HGA) 116, which includes the transducing head 104, over a desired portion of the media 108.

The transducing head 104 can include one or more transducing elements, such as a magnetic writer and magnetically responsive reader, which operate to program data to and read data from the storage media 108, respectively. In this way, controlled motion of the actuating assembly 102 and spindle motor 110 can modulate the position of the transducing head both laterally along predetermined data tracks (not shown) defined on the storage media surfaces and vertically as measured perpendicularly to the media surface 114 to selectively write, read, and rewrite data.

Figure 2:
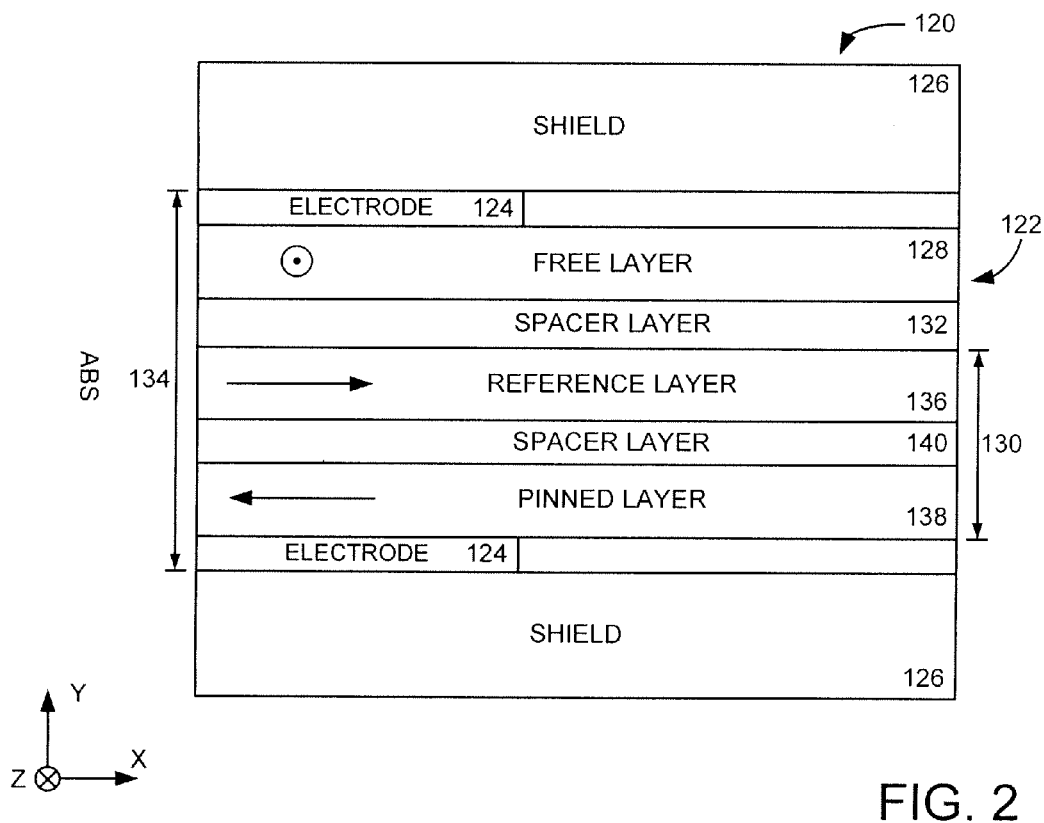
FIG. 2 shows a block representation of an example magnetic data reader capable of being used in the data storage device of FIG. 1 in some embodiments.

FIG. 2 shows a cross-sectional block representation of an example magnetic data reader 120 capable of being used in the transducing portion 100 of a data storage device shown in FIG. 1. While not required or limited to the configuration shown in FIG. 2, the magnetic reader 120 has a magnetic stack 122 disposed between electrode layers 124 and magnetic shields 126 on an air bearing surface (ABS). The magnetic stack 122 can be configured as a variety of different data bit sensing laminations, such as a magnetoresistive, tunnel magnetoresistive, and spin valve, but in some embodiments is constructed as a sensor with a magnetically free layer 128 and fixed magnetization reference structure 130 coupled to opposite sides of a non-magnetic spacer layer 132.

The magnetic orientation of the free layer 128 and reference structure 130 acts to provide a measurable magnetoresistive effect when an external data bit is encountered. Various embodiments fix the magnetization of the reference structure 130 via connection with an antiferromagnetic layer. However, inclusion of such an antiferromagnetic layer can add to the shield-to-shield spacing 134 of the reader 120 which can provide difficulties in sensing data bits from reduced form factor data storage devices employing heightened data bit densities and reduced data track widths. With the removal of an antiferromagnetic layer from the magnetic stack 122, the reader's shield-to-shield spacing 134 can be reduced, but at the cost of introducing magnetic instability as the reference structure 130 may be left unsupported, which can correspond with magnetization tilting and asymmetry resulting in overall data signal amplitude loss.

Configuring the free layer 128 with a magnetization direction that differs from the reference structure 130 may compensate for adverse effects resulting from the removal of an antiferromagnetic layer by stabilizing magnetizations in both the reference structure 130 and free layer 128. Setting the magnetization direction of the various layers in the reader 120 can be accomplished in several different, non-limiting, manners such as by setting the intrinsic anisotropy of the reference structure 130 and free layer 128 to provide magnetization directions that are perpendicular and parallel to an air bearing surface (ABS) of the reader 120, respectively.

More specifically, the free layer 128 may be formed with an intrinsic anisotropy that maintains bipolar magnetization in a plane aligned along the Z-axis while a reference layer 136 and pinned layer 138 of the reference structure 130 are formed with intrinsic anisotropies that align the fixed magnetizations respectively along the X-axis. With the magnetizations of the reference and pinned layers 136 and 138 antiferromagnetically coupling across a SAF spacer layer 140 and being out of phase with the magnetization of the free layer 128, magnetic stability of the reader may be optimized to decrease magnetic asymmetry and increase data signal amplitude.

Figure 3:
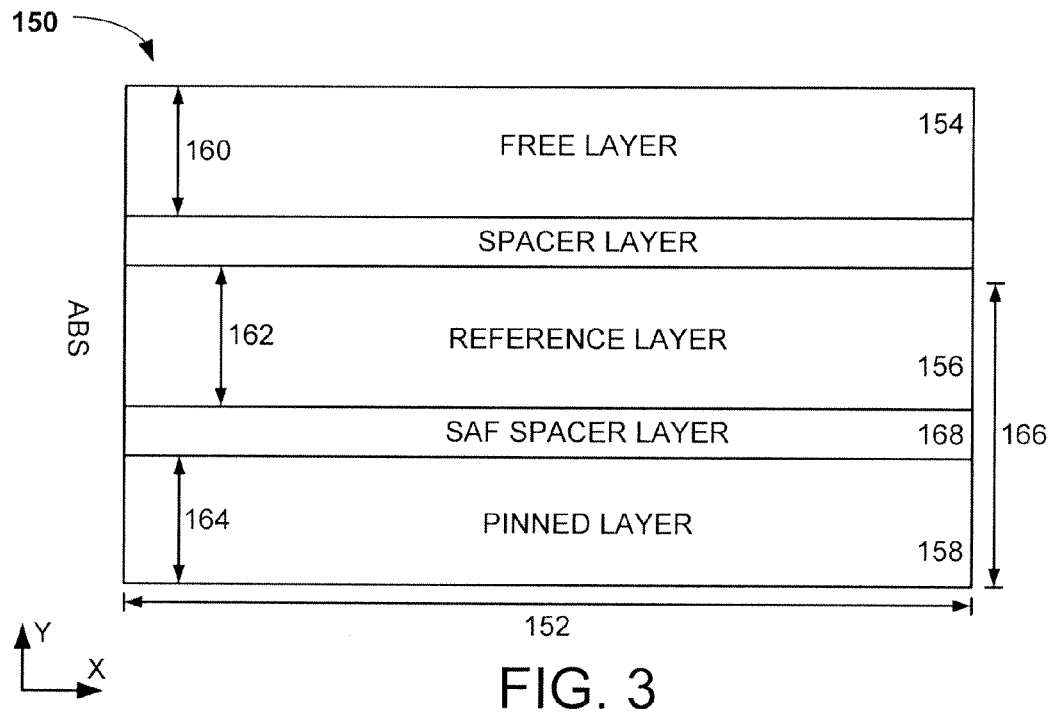
FIG. 3 displays a cross-section of an example magnetic stack in accordance with various embodiments.

The ability to tune the intrinsic anisotropy of the magnetic stack 122 layers may combine with the tuning of the size of the reference structure 130 and free layer 128 to optimize the reader's 120 performance to accommodate various environmental conditions, such as data bit density and data readback rate. FIG. 3 displays a block representation of a cross-section of an example magnetic stack 150 tuned in a variety of manners to provide predetermined data sensing performance. As shown, the magnetic stack 150 is configured as a lamination of layers each having a predetermined stripe height 152 measured from the ABS along the X-axis.

Various embodiments can tune the stripe height 152 of one or more of the free 154, reference 156, and pinned 158 layers individually or collectively to produce multiple different stripe heights 152 for the magnetic stack. Regardless of whether the stripe height 152 is tuned in any way, each of the magnetic stack 150 layers can be optimized for thickness, as measured along the Y-axis. For example, the free layer 154 can be tuned to a first predetermined thickness 160 that differs from second and third predetermined thicknesses 162 and 164 corresponding to the reference 156 and pinned 158 layers, respectively.

In some embodiments, the reference 156 and pinned 158 layers are tuned in view of the overall thickness of the reference structure 166 that includes the SAF spacer layer 168 to balance the magnetizations of the respective layers with respect to the tuned anisotropy strengths and directions. That is, the predetermined thicknesses 162 and 164 of the reference 156 and pinned 158 layers, such as 2.6 nm and 3.1 nm respectively, can be chosen in relation to the intrinsic anisotropy, such as 400 Oe, of each layer 156 and 158 to balance magnetic asymmetry and provide magnetic stability despite the lack of an antiferromagnetic layer being present in the stack 150.

Figure 4:
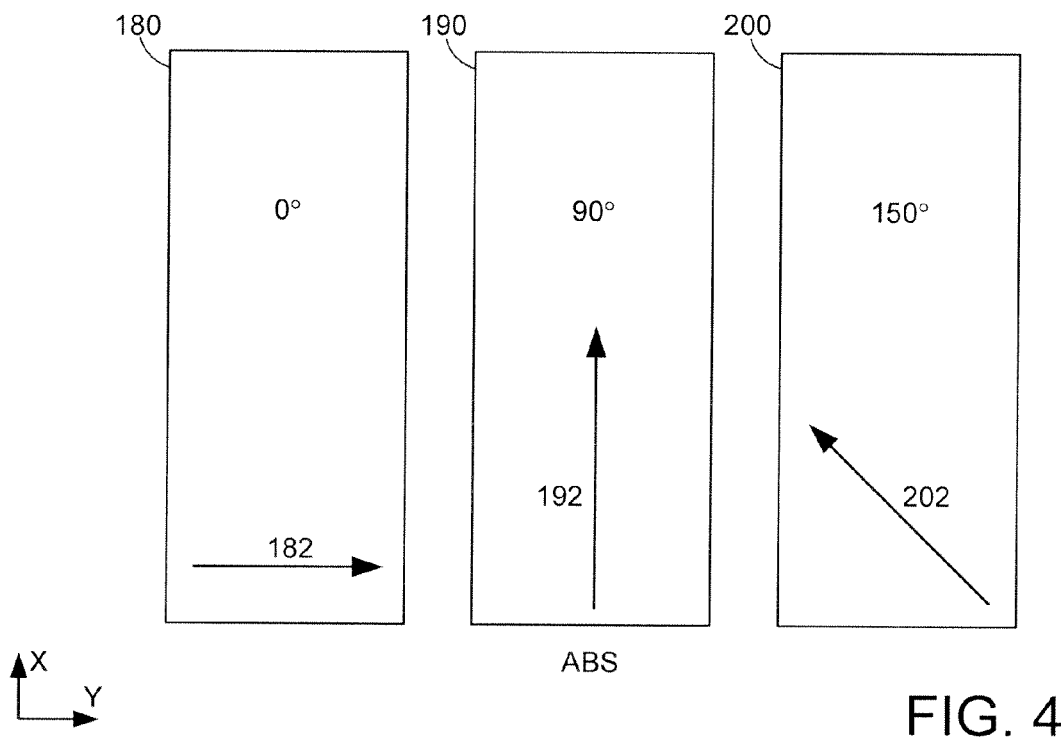
FIG. 4 generally illustrates a top view of a variety of magnetic layers configured in accordance with some embodiments.
Figure 5:
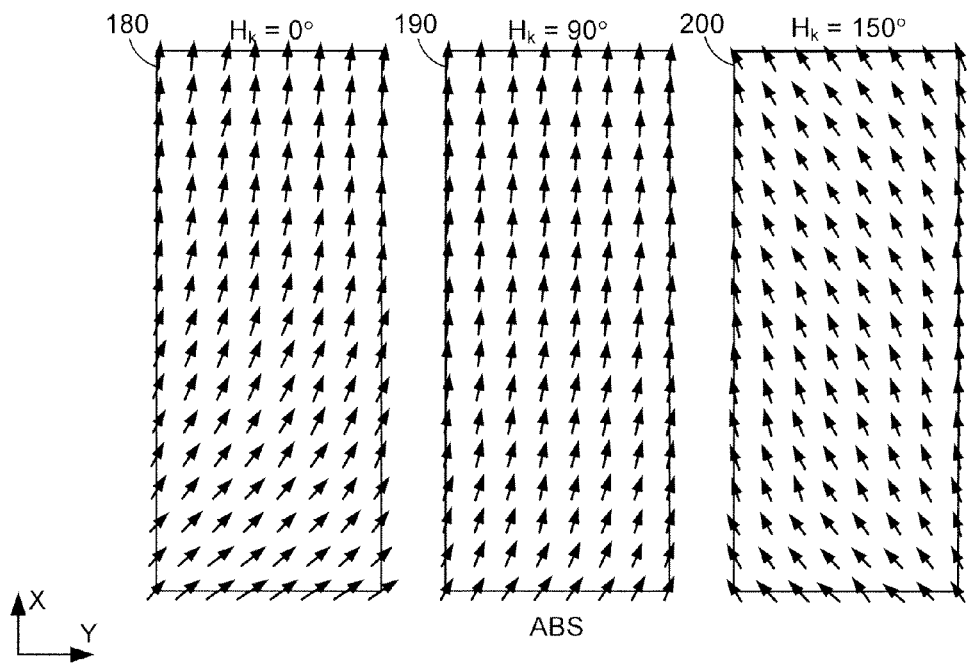
FIG. 5 shows magnetizations for a variety of magnetic layers configured in accordance with various embodiments.

Tuning the thicknesses 160, 162, and 164 and stripe height 152 of the respective magnetic stack 150 layers can be done in isolation or in combination with tuning the intrinsic anisotropy of one or more of the layers. FIGS. 4 and 5 each generally illustrate block top view representations of example layers 180, 190, and 200 each capable of being used in a magnetic stack, such as magnetic stack 122 of FIG. 2. Layer 180 shows how the intrinsic anisotropy can be constructed with a magnetization direction 182 that is parallel to the ABS and the Y-axis while layer 190 displays how the magnetization direction 192 can be oriented along the X-axis, perpendicular to the ABS.

While the orientation of various layers in the same magnetic stack may be tuned with intrinsic anisotropies causing magnetization directions that are normal, parallel or perpendicular, to the ABS, tuning the magnetization direction to a non-normal orientation 202, as displayed by layer 200, can increase data signal amplitude, especially when paired with other magnetic stack layers optimized for thickness and anisotropic strength. It should be noted that the term "non-normal" will be understood to describe an angular orientation not equaling zero or ninety degrees.

It is to further be understood that the manner in which the intrinsic anisotropy and magnetization directions are constructed are not limited to a particular process and may be formed and tuned in a variety of different means. As a non-limiting example, the azimuth angle of grazed oblique deposition onto a seed layer can be used to create tuned intrinsic anisotropy corresponding to a 150 degree non-normal magnetization direction, as generally shown by magnetization 202 in layer 200 of FIG. 4 and more specifically by the magnetizations of layers displayed in FIG. 5. A review of FIG. 5 reveals how the non-normal magnetization direction of layer 200 can provide a more uniform magnetization profile throughout the layer than the normal magnetization directions of layers 180 and 190.

Figure 6:
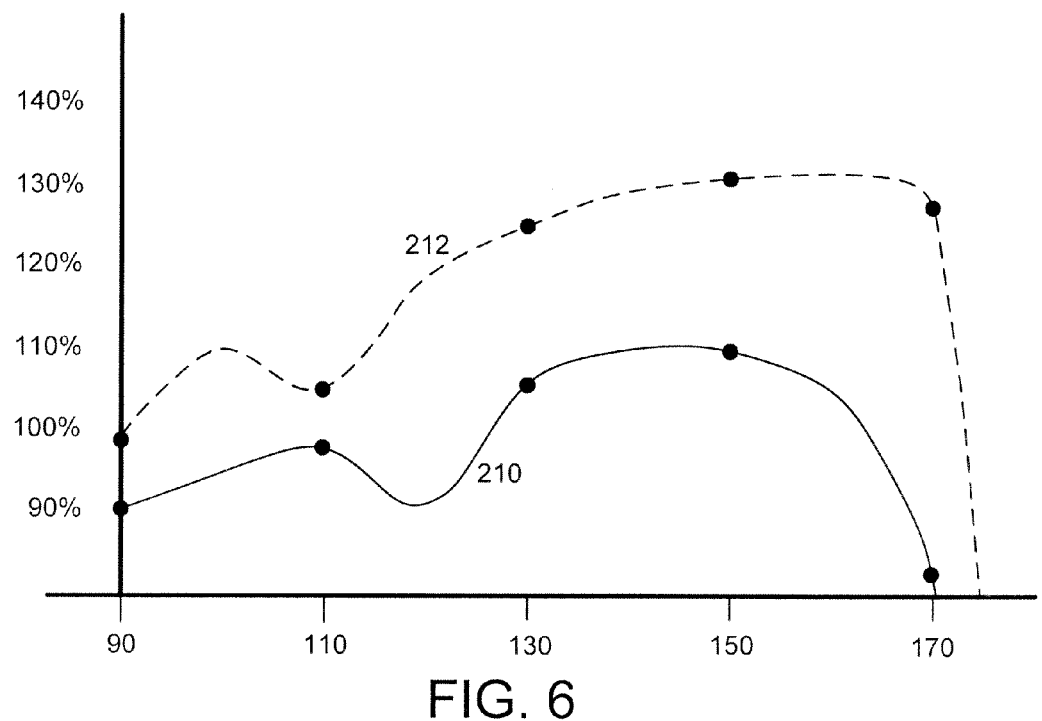
FIG. 6 plots operational data for an example magnetic reader constructed in accordance with some embodiments.

No matter how the intrinsic anisotropy and magnetization direction are formed, the tuning of a non-normal magnetization direction can be done for magnetic stack layers individually or collectively, which can precisely optimize magnetic stack performance as illustrated by the data of FIG. 6. In FIG. 6, the effects of different magnetization directions are graphed in relation to data signal amplitude for a 200 Oe intrinsic anisotropy by solid line 210 and for a 400 Oe intrinsic anisotropy by segmented line 212. With the data from lines 210 and 212, a magnetic stack, and specifically the reference structure of a magnetic reader, can be tuned and optimized to produce data signal amplitudes conducive to various small form factor data storage environments.

A tuned embodiment resulting from the data of FIG. 6 may configure pinned and reference layers of a reference structure each with 400 Oe intrinsic anisotropies and 150 degree non-normal magnetization directions to produce roughly a 131% data signal amplitude, which contrasts sharply with a magnetic stack having non-tuned anisotropy and no antiferromagnetic layer to support the magnetization of the reference structure. The combination of the tuned intrinsic anisotropy direction and magnitude with the tuned thickness and stripe height can provide optimized magnetization asymmetry and stability that allows for relaxed anisotropy amplitude with lower shield-to-shield spacing in addition to greater data signal amplitude.

Figure 7:
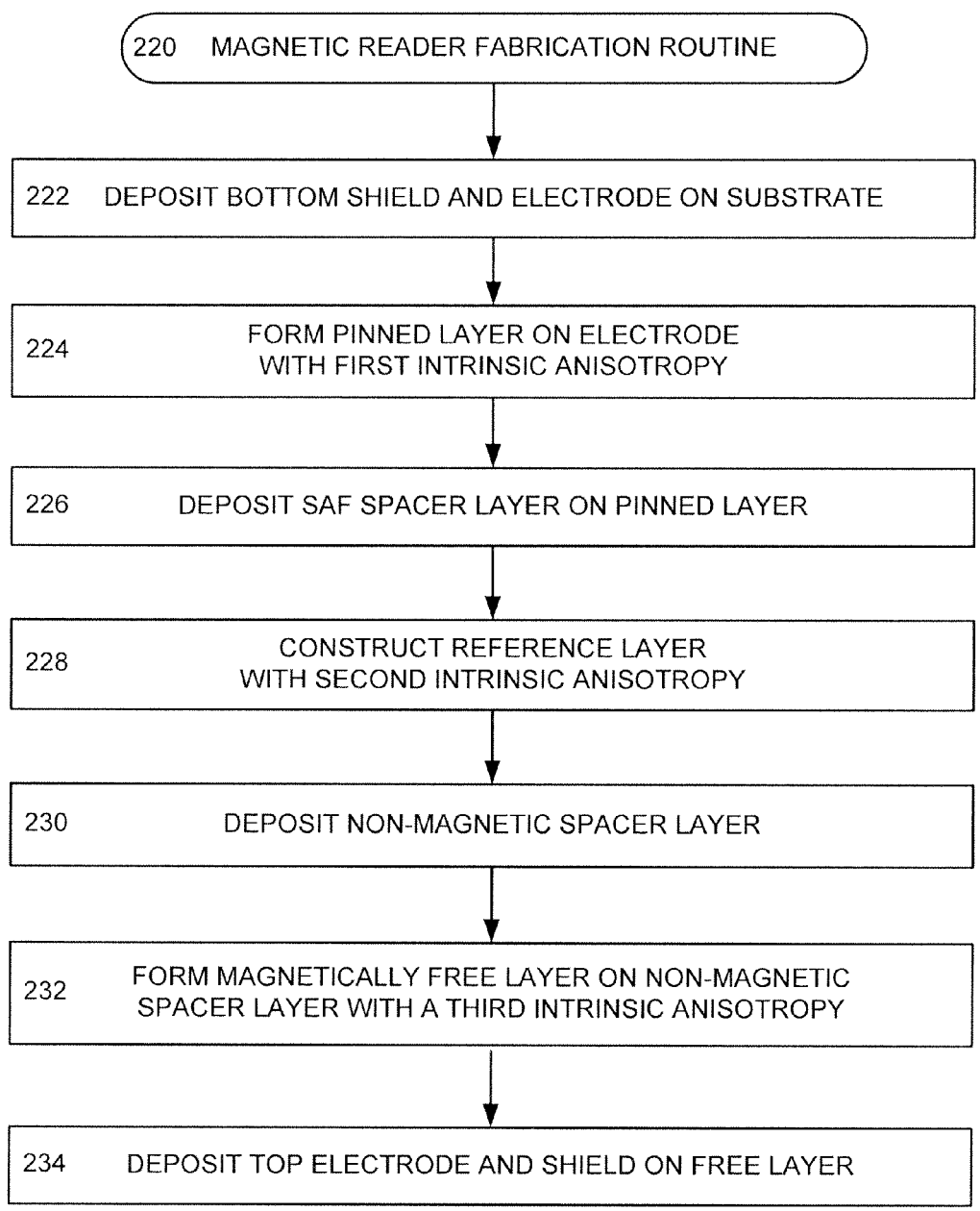
FIG. 7 provides a flowchart of a magnetic reader fabrication routine carried out in accordance with various embodiments.

FIG. 7 provides an example flowchart of a reader fabrication routine 220 that maps how a magnetic stack can be tuned in accordance with various embodiments. The routine 220 may initially deposit a magnetic shield and electrode on a substrate in step 222. The electrode layer can extend from an air bearing surface to a stripe height that is less than or equal to the stripe height of the shield and, in some embodiments, can be configured as a seed layer with material and surface roughness conducive to producing intrinsic anisotropy in a subsequently deposited layer.

Step 224 then forms a pinned layer on the electrode layer that has a predetermined intrinsic anisotropy magnitude and direction with respect to the air bearing surface. A SAF spacer layer is subsequently deposited on the pinned layer in step 226 to provide antiferromagnetic coupling between a reference layer and the pinned layer as well as providing a potential seed layer for constructing the reference layer with predetermined intrinsic anisotropy in step 228. That is, the SAF spacer layer formed in step 226 may have a thickness and non-magnetic material that provides antiferromagnetic coupling and a substrate that may be roughed as a seed layer to aid in producing the intrinsic anisotropy of the reference layer in step 228 with a second magnitude and direction that may be the same, or differ, from the anisotropic magnitude and direction in the pinned layer.

With the formation of the reference layer completing the construction of the fixed magnetization reference structure, step 230 deposits a non-magnetic spacer layer atop the reference layer with a thickness allowing data sensing between the magnetization of the free layer and the reference structure. Various embodiments next form a magnetically free layer on the non-magnetic spacer layer in step 232 with a third intrinsic anisotropy that has different magnitude and direction than the anisotropy of both the reference and pinned layers. Formation of the magnetically free layer in step 232 is then followed by the deposition of a top electrode and shield in step 234.

It should be mentioned that while routine 220 successively deposits layers in a particular sequence, such sequence is not required or limiting as the magnetic stack can comprise any number and orientation of layers. For example, the magnetically free layer may be formed before the reference and pinned layers of the reference structure so that the magnetic stack is flipped in comparison to a stack produced from routine 220.

With the ability to tune the various magnetic stack layers by optimizing the intrinsic anisotropy to produce predetermined magnetization directions and magnitudes, the magnetic operation of the magnetic stack can be tailored to provide predetermined ratios of magnetic stability, data signal amplitude, and magnetic asymmetry. The routine 220, however, is not limited only to the steps and decisions provided in FIG. 7 as any number of steps can be added, omitted, and modified to accommodate the fabrication of a precisely tuned magnetic reader.

It can be appreciated that the configuration and material characteristics of the magnetic reader described in the present disclosure allows for tuned data sensing conducive to high data bit density, small form factor data storage devices. The ability to tune portions of a magnetic stack with a differing anisotropies and magnetization directions may provide increased magnetic stability and reduced asymmetry that promotes higher data signal amplitude. Moreover, the utilization of non-normal intrinsic anisotropy in at least the reference structure of a magnetic stack can provide enough magnetic stability to remove an antiferromagnetic layer and reduce the overall physical size of the magnetic stack. Additionally, while the embodiments have been directed to magnetic sensing, it will be appreciated that the claimed invention can readily be utilized in any number of other applications, including data storage device applications.

It is to be understood that even though numerous characteristics and configurations of various embodiments of the present disclosure have been set forth in the foregoing description, together with details of the structure and function of various embodiments, this detailed description is illustrative only, and changes may be made in detail, especially in matters of structure and arrangements of parts within the principles of the technology to the full extent indicated by the broad general meaning of the terms in which the appended claims are expressed. For example, the particular elements may vary depending on the particular application without departing from the spirit and scope of the present disclosure.

What is claimed is:

1. A magnetic reader comprising a non-magnetic spacer layer disposed between a magnetically free layer and a synthetic antiferromagnet (SAF), the SAF having a predetermined magnetization without an antiferromagnet contacting the SAF, the SAF configured with an anisotropy tuned to a non-normal direction with respect to an air bearing surface (ABS).

2. The magnetic reader of claim 1, wherein the non-normal direction is 150 degrees.

3. The magnetic reader of claim 1, wherein the non-normal direction is greater than 90 degrees.

4. The magnetic reader of claim 1, wherein the free layer has an intrinsic anisotropy that differs from the anisotropy of the SAF.

5. The magnetic reader of claim 1, wherein the free layer and SAF have different thickness as measured parallel to the ABS.

6. The magnetic reader of claim 1, wherein the predetermined magnetization of the SAF has a plurality of fixed magnetizations.

7. The magnetic reader of claim 6, wherein the plurality of fixed magnetizations are fixed via the anisotropy and antiferromagnetic coupling.

8. The magnetic reader of claim 6, wherein the plurality of fixed magnetizations are fixed without the presence of a permanent magnet.

9. The magnetic reader of claim 1, wherein the magnetically free layer has a first magnetization direction that differs from a second magnetization direction of the SAF.

10. An apparatus comprising a first non-magnetic spacer layer disposed between a magnetically free layer and a synthetic antiferromagnet (SAF), the SAF having a predetermined magnetization without an antiferromagnet contacting the SAF, the SAF comprising a second non-magnetic spacer layer disposed between magnetically fixed reference and pinned layers each configured with an anisotropy tuned to a non-normal direction with respect to an air bearing surface (ABS).

11. The apparatus of claim 10, wherein the anisotropy of the reference and pinned layers has a common magnitude.

12. The apparatus of claim 10, wherein the anisotropy of the reference and pinned layers have different magnitudes.

13. The apparatus of claim 10, wherein the magnetically free layer has a first magnetization direction that differs from the second and third magnetization directions for the reference and pinned layers respectively.

14. The apparatus of claim 13, wherein the first magnetization direction is oriented parallel to the ABS and the second and third magnetization directions are each oriented non-normal to the ABS.

15. The apparatus of claim 10, wherein the anisotropy is intrinsic.

16. The apparatus of claim 10, wherein the magnetically free layer has a first thickness, reference layer has a second thickness, and pinned layer has a third thickness, the second and third thicknesses tuned to increase data signal amplitude.

17. The apparatus of claim 16, wherein the first, second, and third thicknesses each differ.

18. A stack comprising:
 a non-magnetic spacer layer disposed between a magnetically free layer and a synthetic antiferromagnet (SAF), the SAF having a predetermined magnetization without an antiferromagnet contacting the SAF; and
 means for tuning the SAF with an anisotropy angled in a non-normal direction with respect to an air bearing surface (ABS).

19. The stack of claim 18, wherein the means for tuning the SAF is oblique deposition of material.

20. The magnetic reader of claim 1, wherein the SAF and magnetically free layer respectively contact first and second electrode layers, each electrode layer contacting a shield.

* * * * *